United States Patent
Huard

(10) Patent No.: US 8,093,874 B1
(45) Date of Patent: Jan. 10, 2012

(54) METHOD AND SYSTEM FOR ADDING BOOST FUNCTIONALITY TO A BUCK SWITCHER WITH MINIMAL COST

(75) Inventor: Jeffry M. Huard, Puyallup, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 811 days.

(21) Appl. No.: 12/221,522

(22) Filed: Aug. 4, 2008

(51) Int. Cl.
G05F 1/24 (2006.01)
G05F 1/00 (2006.01)

(52) U.S. Cl. ........................................ 323/259; 323/284

(58) Field of Classification Search .................. 323/222, 323/259, 344, 271, 272, 282, 284
See application file for complete search history.

(56) References Cited

U.S. PATENT DOCUMENTS

| | | | |
|---|---|---|---|
| 6,404,172 B1 * | 6/2002 | May ............................ | 323/268 |
| 6,900,697 B1 | 5/2005 | Doyle et al. | |
| 6,914,487 B1 | 7/2005 | Doyle et al. | |
| 6,972,530 B1 | 12/2005 | Xin-LeBlanc | |
| 7,078,882 B2 | 7/2006 | Weng et al. | |
| 7,342,387 B1 | 3/2008 | Li | |
| 7,372,239 B2 * | 5/2008 | Kumagai et al. ............... | 323/267 |
| 7,586,296 B2 * | 9/2009 | Kanayama ..................... | 323/282 |
| 7,759,923 B2 * | 7/2010 | Miller et al. ................... | 323/285 |
| 7,863,872 B2 * | 1/2011 | Chiu ............................ | 323/271 |
| 2002/0140410 A1 * | 10/2002 | Rothleitner et al. .......... | 323/282 |
| 2007/0024256 A1 * | 2/2007 | Chou ............................ | 323/268 |
| 2008/0129219 A1 * | 6/2008 | Smith et al. ................... | 315/291 |

OTHER PUBLICATIONS

Yushan Li, "System and Method for Controlling a Regulator Circuit for Radio Frequency Power Amplifier Biases", U.S. Appl. No. 11/818,752, filed Jun. 15, 2007.
Yushan Li, "Power Amplifier Multiple Stage Control for Polar Modulation Circuit", U.S. Appl. No. 12/152,227, filed May 13, 2008.
Yushan Li, et al., "System and Method for Suppressing Load Transients in Radio Frequency Power Amplifier Switching Power Supplies", U.S. Appl. No. 12/008,843, filed Jan. 15, 2008.
Yushan Li, "Circuit and Method for RF Power Amplifier Power Regulation and Modulation Envelope Tracking", U.S. Appl. No. 11/701,747, filed Feb. 2, 2007.
Jeffry M. Huard, "System and Method for Providing an Active Current Assist With Analog Bypass for a Switcher Circuit", U.S. Appl. No. 12/214,280, filed Jun. 18, 2008.
Seth R. Sanders et al., "Active Clamp Circuits for Switchmode Regulators Supplying Microprocessor Loads", 1997 IEEE, pp. 1179-1185.
Albert M. Wu et al., "An Active Clamp Circuit for Voltage Regulation Module (VRM) Applications", IEEE Transactions on Power Electronics, vol. 16, No. 5, Sep. 2001, pp. 623-634.
Luca Amoroso et al., "Single Shot Transient Suppressor (SSTS) for High Current High Slew Rate Microprocessor", 1999 IEEE, pp. 284-288.

* cited by examiner

Primary Examiner — Adolf Berhane
Assistant Examiner — Emily Pham

(57) ABSTRACT

A buck (with boost) switcher is provided that adds boost functionality to a buck switcher without compromising the buck's performance with extra series-coupled switches nor requiring a second inductor. The switcher has an integrated circuit that is capable of receiving a power supply voltage and a mode signal and generating on separate outputs either a boost voltage or a buck voltage based on the power supply voltage and the mode signal. The mode signal corresponds to one of a buck mode and a boost mode. The switcher also has a single inductor that is coupled to the integrated circuit and is capable of being used by the integrated circuit to generate the boost voltage (or a high voltage capable current) in the boost mode and to generate the buck voltage in the buck mode.

20 Claims, 2 Drawing Sheets

METHOD AND SYSTEM FOR ADDING BOOST FUNCTIONALITY TO A BUCK SWITCHER WITH MINIMAL COST

CROSS-REFERENCE TO RELATED APPLICATIONS

The present application is related to U.S. patent application Ser. No. 12/214,280, titled "SYSTEM AND METHOD FOR PROVIDING AN ACTIVE CURRENT ASSIST WITH ANALOG BYPASS FOR A SWITCHER CIRCUIT," filed on Jun. 18, 2008. This patent application is assigned to the assignee of the present application. The subject matter disclosed in this patent application is hereby incorporated by reference into the present disclosure as if fully set forth herein.

TECHNICAL FIELD

This disclosure is generally directed to switcher circuits. More specifically, this disclosure is directed to a method and system for adding boost functionality to a buck switcher with minimal cost. It provides separate outputs for the buck and boost and assumes the application calls for one output to be functioning at a time.

BACKGROUND

Many electronic devices implement both buck and boost functionality for components of the electronic devices. For example, conventional cellular phones that incorporate a camera often use a buck switcher for a power amplifier and use a boost switcher for a flash for the camera. However, in applications such as these, board space is considered an important resource, and implementing both a buck switcher and a boost switcher involves the consumption of a relatively large portion of the board space. For example, both a magnetic buck switcher and a magnetic boost switcher generally use an inductor, which is a large component. Thus, using a first inductor to implement a buck switcher and a second inductor to implement a boost switcher may significantly affect the size of the device incorporating those inductors. Minimizing the size of many electronic devices, such as cell phones, is an important design consideration, and the use of two switchers and their corresponding inductors in such a device undesirably limits minimization. The additional components also increase the cost of the final product, which is an important consideration for consumer electronics such as cell phones.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
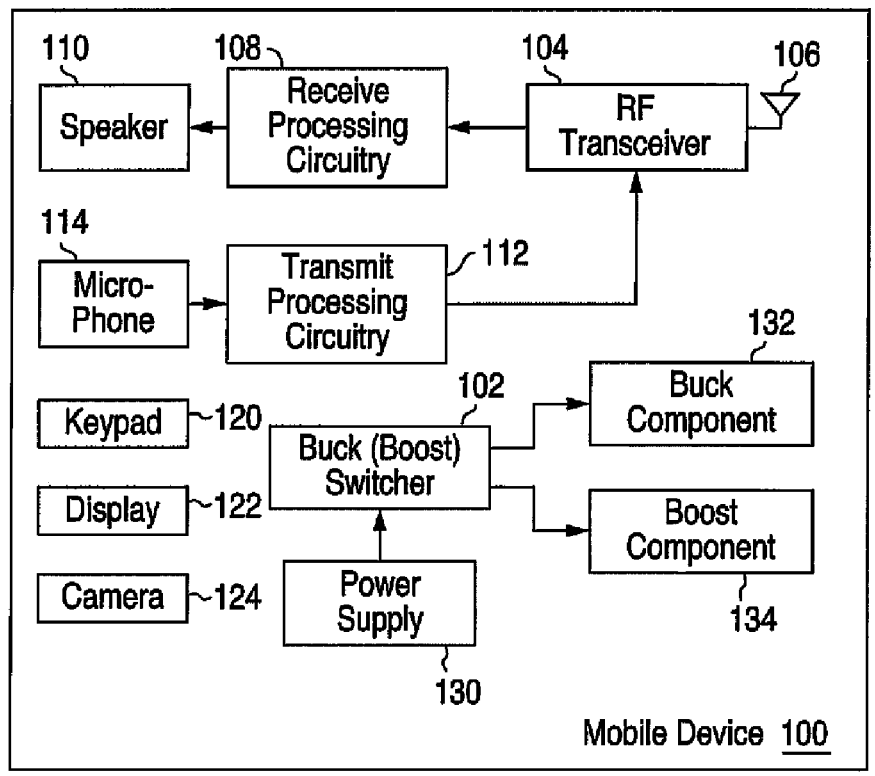
FIG. 1 illustrates a mobile device that includes a buck (with boost) switcher configured in accordance with one embodiment of this disclosure.
Figure 2:
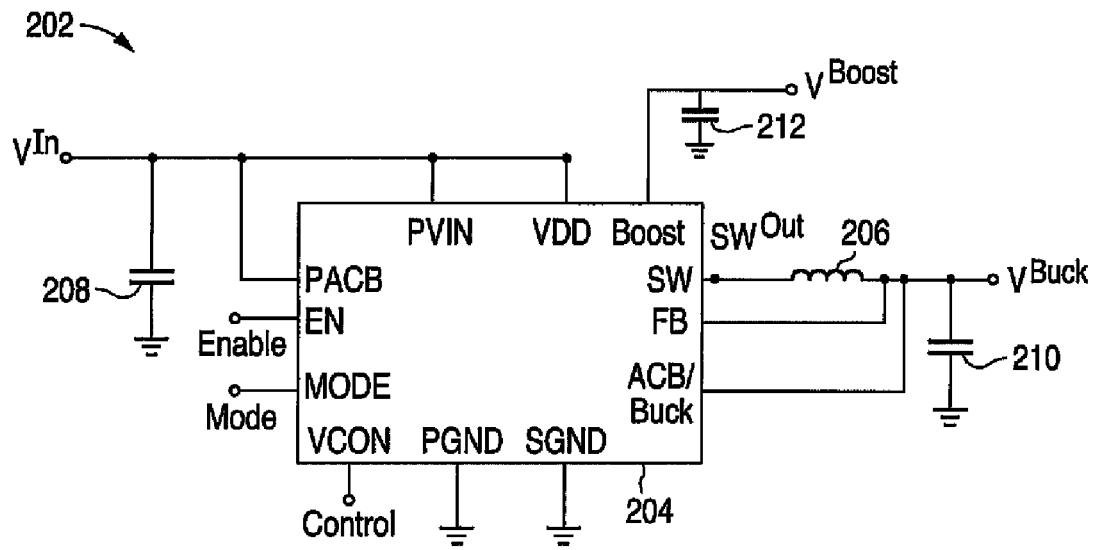
FIG. 2 illustrates an integrated circuit implementation of the switcher of FIG. 1 in accordance with one embodiment of this disclosure.
Figure 3:
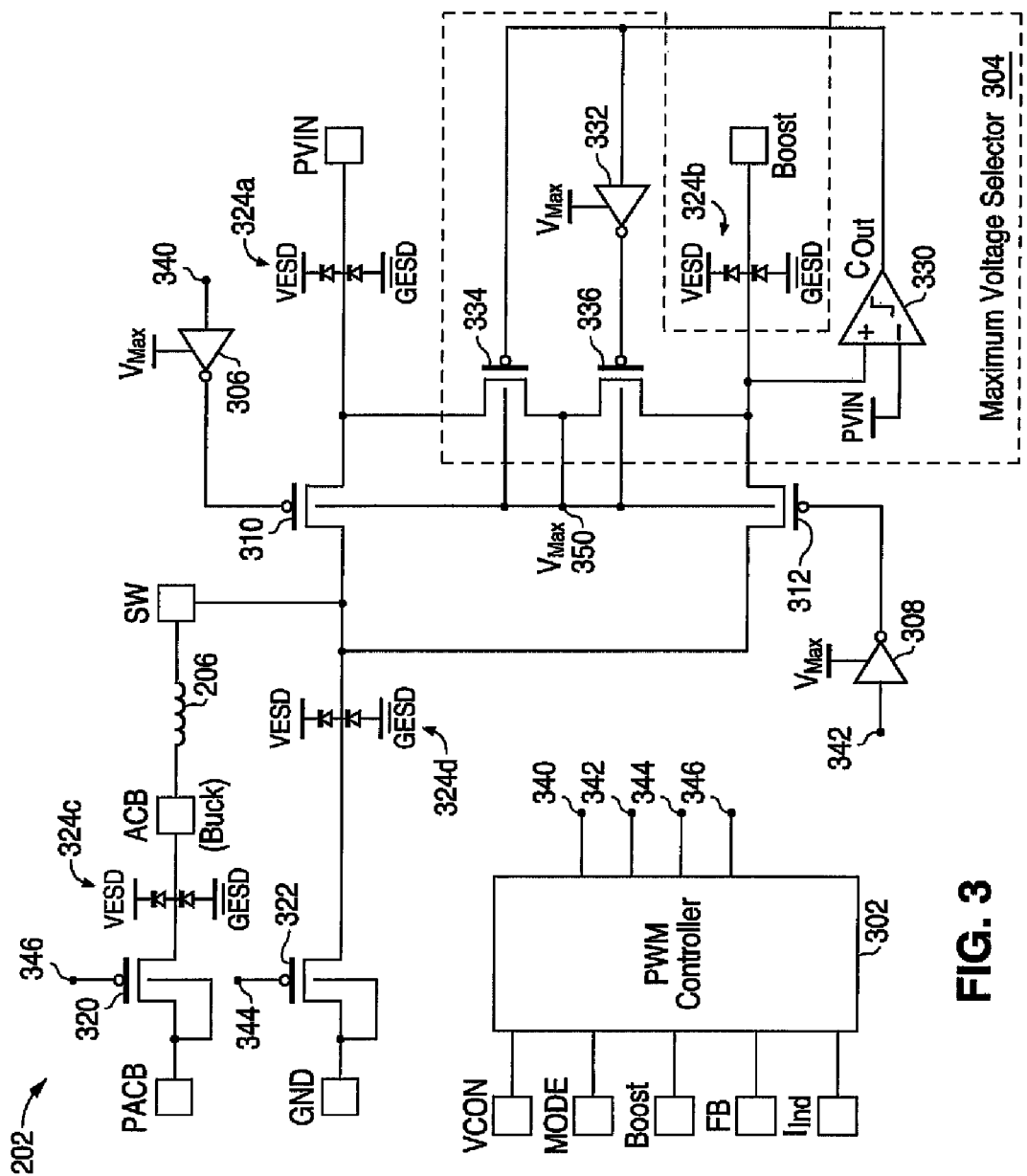
FIG. 3 illustrates details of the switcher of FIG. 2 in accordance with one embodiment of this disclosure.

FIGS. 1-3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device or system.

FIG. 1 illustrates a mobile device 100 that includes a buck (with boost) switcher 102 configured in accordance with one embodiment of this disclosure. The mobile device 100 may comprise any suitable portable device, such as a cell phone, a PCS handset, a personal digital assistant, a portable computer, a telemetry devices, or the like.

For the embodiment in which the mobile device 100 comprises a cell phone, the mobile device 100 may comprise a radiofrequency (RF) transceiver 104, an antenna 106, receive processing circuitry 108, a speaker 110, transmit processing circuitry 112, a microphone 114, a keypad 120, a display 122, and a camera 124. For any embodiment of the mobile device 100, the mobile device 100 comprises a power supply 130, at least one buck component 132, and at least one boost component 134, in addition to the switcher 102. As used herein, a "buck component" means a component that operates using a power supply voltage (or current) that is generated by reducing the voltage provided by the power supply 130. Similarly, a "boost component" means a component that operates using a power supply voltage (or current) that is generated by increasing the voltage (or creating a high voltage capable current source) provided by the power supply 130. The mobile device 100 may also comprise any other suitable components, such as a processor, an input/output interface, memory and/or the like.

For the illustrated embodiment, the RF transceiver 104 may receive from the antenna 106 an incoming RF signal transmitted over a wireless network. The RF transceiver 104 down-converts the incoming RF signal to produce an intermediate frequency (IF) or a baseband signal. The IF or baseband signal is sent to the receive processing circuitry 108, which produces a processed baseband signal by filtering and digitizing the signal and demodulating and/or decoding the signal. The receive processing circuitry 108 transmits the processed signal to the speaker 110 or to a processor for further processing.

The transmit processing circuitry 112 receives analog or digital voice data from the microphone 114 or other outgoing data from a processor. The transmit processing circuitry 112 encodes, modulates, multiplexes and/or digitizes the outgoing data to produce a processed baseband or IF signal. The RF transceiver 104 receives the outgoing processed signal from the transmit processing circuitry 112 and up-converts the signal to an RF signal that is transmitted over the antenna 106.

A user of the mobile device 100 may use the keypad 120 to provide data to the mobile device 100. The display 122 may comprise a liquid crystal display or other suitable display that is capable of providing text and/or graphics to the user. The camera 124 is capable of providing camera functionality for the mobile device 100. Thus, the camera 124 allows the user to capture images, which may be stored in a memory of the mobile device 100. As described in more detail below, for the embodiment in which the camera 124 is included in the mobile device 100, the mobile device 100 may also comprise a flash as a boost component 134.

The power supply 130 may comprise a battery, super cap with charger or other suitable power source that is capable of providing power for the mobile device 100 by generating a power supply voltage. Thus, although illustrated as coupled to the switcher 102, it will be understood that the power supply 130 may provide power to any or all components of the mobile device 100.

The switcher 102 is capable of providing a buck function with regard to the power supply 130 in order to reduce the voltage provided by the power supply 130 to the load (i.e., the buck component 132). The switcher 102 is also capable of providing a boost function with regard to the power supply 130 in order to increase the voltage (or provide a high voltage capable current source) provided by the power supply 130 to the load (i.e., the boost component 134). The switcher 102 is also capable of providing the reduced voltage (or current source) to the boost component 134 of the mobile device 100. For example, this might be desirable when the power supply 130 is a fully charged battery and/or when the boost component 134 is in a mode not requiring a high voltage (e.g., a flash in torch mode).

Although illustrated as separate from the other components of the mobile device 100, it will be understood that the buck component 132 and/or the boost component 134 may comprise any one or more components of the mobile device 100, including any components within the RF transceiver 104, the receive processing circuitry 108 or the transmit processing circuitry 112. For a particular embodiment, the buck component 132 may correspond to a power amplifier for the mobile device 100 and the boost component 134 may correspond to a flash for the camera 124.

As described in more detail below, the switcher 102 provides both buck and boost functionality while sharing many components, including a single inductor, in order to minimize the size and cost of the switcher 102. Thus, the size of the mobile device 100 is minimally impacted by the implementation of both buck and boost switching, as opposed to a device implementing only buck switching. In addition, the boost functionality is added without including a series-coupled switch in the buck current path, the inclusion of which would add resistance to the buck current path and thus decrease buck performance.

The switcher 102 is capable of operating in either a buck mode or a boost mode. Thus, for the illustrated embodiment in which the mobile device 100 comprises a cell phone, the buck mode may be used when a user of the device 100 is making a call and the boost mode may be used to power the flash when the user is taking a picture with the camera 124. It will be understood that the buck and boost modes may be selected for other suitable applications for either the cell phone embodiment of the device 100 or any other suitable embodiment of the device 100.

FIG. 2 illustrates an integrated circuit implementation of a buck (with boost) switcher 202 in accordance with one embodiment of this disclosure. The switcher 202 may correspond to the switcher 102 of the mobile device 100. However, it will be understood that the switcher 202 may be implemented in any other suitable system or device, whether mobile or stationary.

For the embodiment of FIG. 2, the switcher 202 comprises an integrated circuit 204, a single inductor 206, an input capacitor 208, an output buck capacitor 210, and an output boost capacitor 212. For an alternative embodiment, the output boost capacitor 212 may be replaced by LED flash diodes. The integrated circuit 204 of the illustrated embodiment comprises a plurality of pins: VDD, PVIN, PACB, EN, MODE, VCON, PGND, SGND, ACB/Buck, FB, SW and Boost. It will be understood that the integrated circuit 204 may be otherwise suitably implemented without departing from the scope of this disclosure.

The switcher 202 is capable of receiving as inputs a power supply voltage ($V_{In}$), an enable signal, a mode signal and a control signal. The power supply voltage may be received at the VDD, PVIN and PACB pins from a battery or other suitable power source, such as the power supply 130 of FIG. 1. The power supply voltage is also coupled to the input capacitor 208, which is capable of filtering the buck or boost switching currents.

The enable signal may be received at the EN pin and may be used to enable or disable the switcher 202. For example, a digital high signal may be used to enable normal operation of the switcher 202, while a digital low signal may be used to disable the switcher 202 (or vice versa). It will be understood that the enable signal may be otherwise implemented.

The mode signal may be received at the MODE pin and may be used to select either the buck mode or the boost mode for the switcher 202. For example, a digital high signal may be used to select the buck mode, while a digital low signal may be used to select the boost mode (or vice versa). It will be understood that the mode signal may be otherwise implemented. The control signal may be received at the VCON pin and may be used to provide dynamic output voltage adjustment for the switcher 202. In the boost mode, the VCON pin may be used to adjust the output current instead of voltage. For example, the control signal may be increased to increase the output voltages (or current) of the switcher 202 and decreased to decrease the output voltages (or current) of the switcher 202. The control signal can be implemented in either analog or digital interfaces. A power ground may be coupled to the PGND pin, and a signal ground may be coupled to the SGND pin.

The switcher 202 is capable of generating as outputs a switcher output ($SW_{Out}$), a buck voltage ($V_{Buck}$), and a boost voltage ($V_{Boost}$). The switcher 202 is also capable of receiving a feedback signal. The switcher output may be generated at the SW pin and may be a pulse width modulated, high-power digital signal. The buck voltage may be generated at the ACB/Buck pin by filtering the switcher output with the inductor 206 and the output buck capacitor 210 to generate a DC buck voltage that is a function of the duty cycle of the switcher output, $SW_{Out}$. The buck voltage may also be received as the feedback signal at the FB pin. The boost voltage may be generated at the Boost pin and filtered by the inductor 206, the output boost capacitor 212 or load. Although illustrated and described as a boost voltage, it will be understood that the output generated at the Boost pin may correspond to the boost voltage and/or a high voltage capable current source associated with the boost voltage. In the case of a flash diode load, the boost switcher may go to 0% duty cycle and source a current such that the buck voltage is well below the $V_{In}$ voltage. This may occur, for example, if the power supply is a fully-charged battery and/or the load is a flash in torch mode.

The SW pin may be shared between buck and boost modes for the switcher 202. For example, for the buck mode, the SW pin is effectively a digital signal whose low level is 0 Volts and whose high level is the power supply voltage as applied to the PVIN pin. Also, in the buck mode, the inductor 206 may cause the SW pin to over/undershoot during dead time. The duty cycle of the SW pin sets the buck output voltage. The output at the Boost pin in the buck mode may be floating (toward ground). For the boost mode, the SW pin may vary between 0 Volts and the boost voltage. As with the buck mode, in the boost mode the inductor 206 may provide over/undershoot during dead time. The output at the Boost pin in the boost mode is the boost voltage, which is normally greater than the power supply voltage at the PVIN pin. Alternatively, the output could be in current source mode and range between 0V and the boost voltage. The output of the Buck pin in the boost mode is normally at the power supply voltage but can be less, especially when the boost is in current source mode with an output voltage that is less than the supply voltage.

The buck voltage may be coupled to any suitable buck component (not shown in FIG. 2), such as the buck component 132 of FIG. 1, and the boost voltage may be coupled to any suitable boost component (not shown in FIG. 2), such as the boost component 134 of FIG. 1. Thus, for example, the buck voltage may be coupled to a power amplifier and the boost voltage may be coupled to a flash for a camera for an embodiment in which the switcher 202 is implemented in a cell phone. As a safeguard, the boost voltage may be limited to a maximum boost voltage (e.g., 4.5 Volts or other suitable voltage) in order to avoid reliability or latch-up issues when the boost component provides a light load for the switcher 202.

For a particular embodiment, the inductor 206 may comprise about 2.2 µH, the input capacitor 208 may comprise about 10 µF, the output buck capacitor 210 may comprise about 4.7 µF, and the output boost capacitor 212 may comprise about 4.7 µF or other suitable load. For this embodiment, the power supply voltage may comprise about 3.1 to 5.0 Volts, the buck voltage may comprise about 0.5 to 3.4 Volts, and the boost voltage may comprise about 3.1 to 4.5 Volts (with a corresponding maximum boost current of about 1 Amp).

FIG. 3 illustrates details of the buck (with boost) switcher 202 in accordance with one embodiment of this disclosure. The illustrated embodiment includes the integrated circuit 204 and the inductor 206, but the capacitors 208, 210 and 212 as well as much of the analog control circuitry (e.g., FB, ACB, etc.) are not shown in FIG. 3 for simplicity. Refer to patent application Ser. No. 12/214,280, titled "SYSTEM AND METHOD FOR PROVIDING AN ACTIVE CURRENT ASSIST WITH ANALOG BYPASS FOR A SWITCHER CIRCUIT," filed on Jun. 18, 2008, for ACB control on net 346. Alternately, ACB and net 346 could be implemented as a standard digital bypass. Those skilled in the art will understand how to implement the FB control systems and remaining analog circuitry. The pins of the integrated circuit 204 are each graphically depicted by a box labeled with the corresponding pin designation. The box labeled "$I_{Ind}$" corresponds to the current through the inductor 206.

For this embodiment, the integrated circuit 204 comprises a pulse width modulation (PWM) controller 302, a maximum voltage selector 304, a buck high side inverter 306, a boost high side inverter 308, a buck high side transistor 310, a boost high side transistor 312, a bypass transistor 320, a low side transistor 322, and a plurality of electrostatic discharge (ESD) circuits 324a-d. Each ESD circuit 324 may have its own corresponding ESD Merrill clamp and is capable of providing a safeguard from damage or latch-up due to electrostatic discharge. For the illustrated embodiment, the maximum voltage selector 304 comprises a comparator 330, an inverter 332, a low-voltage transistor 334 and a high-voltage transistor 336. The boost high side transistor 312, the bypass transistor 320, and the buck high side transistor 310 comprise relatively large transistors as compared to the other transistors 322, 334 and 336 in the switcher 202.

The PWM controller 302 is capable of receiving the mode signal, in conjunction with feedback signals from buck (called FB) or the Boost pin, and generating appropriate PWM duty cycles for a buck high side signal 340, a boost high side signal 342, and a low side signal 344 based on the mode signal and feedback error voltages. In the case in which the boost output acts as a high voltage capable current source, the PWM controller 302 would be used to limit maximum voltage for safe operation and control the duty cycle to set output current. The maximum voltage selector 304 is capable of selecting the higher of the power supply voltage and the boost voltage for tub switching when standard CMOS processes are used. This provides the c bias voltage for the bulk nodes of the PMOS transistors.

For the illustrated embodiment, the transistors 310, 312, 320, 334 and 336 comprise PFET transistors and the low side transistor 322 comprises an NFET transistor. However, it will be understood that other suitable transistors may be implemented in the switcher 202 without departing from the scope of this disclosure. In addition, it should be noted that the boost high side transistor 312 comprises a non-series-coupled switch with respect to the current path during buck operation of the switcher 202, which is described below. Thus, as no resistance is added by a series-coupled switch, the buck performance of the switcher 202 is not sacrificed by the addition of boost functionality via the non-series-coupled boost high side transistor 312.

In operation, according to one embodiment, the PWM controller 302 generates the buck high side signal 340, the boost high side signal 342, the low side signal 344 and a bypass signal 346 in accordance with the received mode signal. It will be understood that the PWM controller 302 may generate other signals without departing from the scope of this disclosure. The buck high side signal 340 is applied to the buck high side inverter 306, the boost high side signal 342 is applied to the boost high side inverter 308, the low side signal 344 is applied to the gate of the low side transistor 322, and the bypass signal 346 is applied to the gate of the bypass transistor 320. These signals 340, 342, 344 and 346 determine a mode for the switcher 202, which is capable of generating the buck voltage in the buck mode or the boost voltage in the boost mode. As described below, the switcher 202 may also operate in a boost bypass mode that corresponds to a non-standard boost mode with a duty cycle of 0% or one of several buck bypass modes.

The maximum voltage selector 304 selects as the maximum voltage for the signal $V_{Max}$ the higher of the power supply voltage and the boost voltage. This is used to correctly bias the PFET bulk nodes as indicated in FIG. 3. To accomplish this, the comparator 330 compares the power supply voltage at the PVIN pin to the boost voltage at the Boost pin and generates a comparator output ($C_{Out}$) based on the comparison. The signal $C_{Out}$ then enables one of the two PFET transistors labeled 334 and 336.

In the standard buck mode, the power supply voltage at the PVIN pin is greater than the boost voltage at the Boost pin. In this case, $C_{Out}$ is low, which turns on the low-voltage transistor 334 and turns off the high-voltage transistor 336 via the inverter 332. Thus, the power supply voltage is provided via the low-voltage transistor 334 at an output node 350 for the maximum voltage selector 304. As a result, the maximum voltage selector 304 selects the power supply voltage as the maximum voltage, $V_{Max}$, when the switcher 202 is in the buck mode.

In the standard boost mode, the boost voltage at the Boost pin is greater than the power supply voltage at the PVIN pin. In this case, $C_{Out}$ is high, which turns on the high-voltage transistor 336 via the inverter 332 and turns off the low-voltage transistor 334. Thus, the boost voltage is provided via the high-voltage transistor 336 at the output node 350 for the maximum voltage selector 304. As a result, the maximum voltage selector 304 selects the boost voltage as the maximum voltage, $V_{Max}$, when the switcher 202 is in the boost mode.

It will be understood that the comparator 330 may be implemented with the inputs reversed such that a higher power supply voltage results in $C_{Out}$ being high and a higher boost voltage results in $C_{Out}$ being low. For this embodiment, the inverter 332 may be coupled to the low-voltage transistor 334 instead of the high-voltage transistor 336. Other similar modifications may be made to other components of the switcher 202.

When the switcher 202 is in the buck mode, the buck high side signal 340 from the PWM controller 302 comprises a digital pulse width modulated signal having a duty cycle determined by the PWM controller 302 in accordance with the application in which the switcher 202 is implemented. The boost high side signal 342 from the PWM controller 302 comprises 0 Volts, thereby turning off the boost high side transistor 312 via the boost high side inverter 308. The low side signal 344 from the PWM controller 302 comprises a digital pulse width modulated signal having a duty cycle determined by the PWM controller 302 in accordance with the application in which the switcher 202 is implemented.

In addition, the bypass signal 346 that is applied to the gate of the bypass transistor 320 may comprise a variable signal between low and high, thereby providing an additional current path via the bypass transistor 320. The bypass transistor 320 comprises an Active Current and analog Bypass (ACB) circuit that provides a current-limiting feature for the switcher 202. This ACB circuit may be implemented in accordance with U.S. patent application Ser. No. 12/214,280, which is incorporated by reference. Alternately, the ACB circuit may be implemented as a standard digital bypass or other suitable variant.

When the switcher 202 is in the boost mode, the buck high side signal 340 from the PWM controller 302 comprises 0 Volts, thereby turning off the buck high side transistor 310 via the buck high side inverter 306. The boost high side signal 342 from the PWM controller 302 comprises a digital pulse width modulated signal having a duty cycle determined by the PWM controller 302 in accordance with the application in which the switcher 202 is implemented. The low side signal 344 from the PWM controller 302 also comprises a digital pulse width modulated signal having a duty cycle determined by the PWM controller 302 in accordance with the application in which the switcher 202 is implemented. In addition, the bypass signal 346 for the bypass transistor 320 comprises 0 Volts, thereby turning on the bypass transistor 320. This results in the power supply voltage (as applied to the PACE pin) being coupled to the inductor 206 via the ACB pin.

The bypass transistor 320 is typically the largest transistor in the switcher 202. Because this transistor 320 is implemented in the switcher 202 for buck operation, it is available for boost operation. Boost operation is minimally sacrificed by including the bypass transistor 320 in the boost current path because the large size of the transistor 320 adds minimal series resistance and no switching losses. In addition, as described in more detail below, since the bypass transistor 320 typically has a current-setting or current-limiting feature, that feature may be exploited for setting current in a non-standard boost mode in which the output voltage is lower than the input voltage.

In both the standard buck mode and the standard boost mode, the transistors 310 and 322 (for buck operation) or 312 and 322 (for boost operation) and their corresponding operating points may be optimized independently. For example, for buck operation, the buck high side transistor 310 and the low side transistor 322 are both switching. Thus, the amount of either or both of these transistors 310 and 322 that is switched may be dynamically adjusted to optimize buck performance of the switcher 202. Similarly, the transistors 312 and 322 may be dynamically adjusted to optimize boost performance of the switcher 202. As a particular example, it may be desirable for some applications to use the full size of the low side transistor 322 during buck mode and to use about half the size of the low side transistor 322 during boost mode.

The switcher 202 may also operate in a boost current limited bypass mode (or non-standard boost mode) in which the boost voltage is equal to or less than the power supply voltage and no switching is implemented. For example, for the embodiment in which the switcher 202 is implemented in a cell phone and the boost mode may be used for powering a flash for a camera 124, the bypass mode may be used when operating conditions for the cell phone do not require boosting. In particular, if the power supply 130 is fully charged, boosting may not be required for the flash. For example, in this case, the power supply may be at 4.2V and the flash in torch mode may only require 2.4V at the current required for torch mode. In this case, either the bypass transistor 320 and/or the boost high side transistor 312 would have to provide the current setting function. In this embodiment, the ACB output is already a current DAC and can easily provide an output current.

For the boost current limited bypass mode, the ACB circuit as stated earlier may be used to provide the current limiting function to the load (e.g., an LED camera flash). The ACB DAC as described in U.S. patent application Ser. No. 12/214,280 can be simply modified to be a programmable current source to provide this function. For the boost bypass mode, the buck high side signal 340 from the PWM controller 302 comprises 0 Volts, thereby turning off the buck high side transistor 310 via the buck high side inverter 306. The boost high side signal 342 from the PWM controller 302 comprises the power supply voltage as applied to the PVIN pin with a 0% duty cycle, thereby turning on the boost high side transistor 312 via the boost high side inverter 308. The low side signal 344 from the PWM controller 302 comprises 0 Volts, thereby turning off the low side transistor 322. In this case, the bypass transistor 320 is used as a current-limiter for the boost current associated with the boost voltage output. For another embodiment, instead of the bypass transistor 320, the boost high side transistor 312 may function as a current-limiting device in the boost bypass mode.

The switcher 202 may also operate in non-standard buck-related modes. For example, in the case of buck with ACB, the switcher 202 may operate in the standard buck mode and one or more non-standard buck modes, such as buck with AC (i.e., active current support for extending the drive current), analog bypass (i.e., buck with analog bypass to improve drop out performance) and/or full bypass mode.

When the switcher 202 is operating in the buck mode, the boost voltage is off (i.e., in a tri-state mode). When the switcher 202 is operating in the boost mode, the ACB circuit couples the power supply voltage to the buck voltage, essentially bypassing the buck portion of the switcher 202. As a result, for some applications, the buck component that is coupled to the switcher 202 may be capable of disabling itself or being disabled by another component if it is undesirable to provide the power supply voltage to the buck component during the boost operation of the switcher 202.

In this way, boost functionality may be added to a buck switcher 202 using a single inductor 206 for both buck and boost operation and without adding a series-coupled switch to the buck current path. In addition, other components may be shared between the buck and boost modes for the switcher 202. Thus, because of the shared components, especially the large inductor, the amount of board space required to implement the switcher 202 is greatly decreased as compared to an application implementing independent buck and boost switchers. Also, due to the use of fewer components in the switcher 202 as a result of sharing, the cost of the switcher 202 is reduced as compared to two independent switchers. Moreover, the use of a non-series-coupled switch for the boost mode allows the addition of the boost functionality without causing a loss in buck performance.

It may be advantageous to set forth definitions of certain words and phrases that have been used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A buck (with boost) switcher, comprising:
    an integrated circuit configured to receive a power supply voltage and a mode signal and to generate a boost voltage, a boost current or a buck voltage based on the power supply voltage and the mode signal, the mode signal corresponding to one of a buck mode and a boost mode; and
    a single inductor coupled to the integrated circuit and configured to be used by the integrated circuit to generate the boost voltage or the boost current in the boost mode and to generate the buck voltage in the buck mode;
    wherein the integrated circuit comprises a maximum voltage selector configured to select one of the power supply voltage and the boost voltage as a maximum voltage for use in operating the switcher, the maximum voltage selector comprising:
    a comparator configured to compare the power supply voltage and the boost voltage to generate a comparator output;
    a high-voltage transistor coupled to the comparator and configured to select the boost voltage as the maximum voltage when the comparator output indicates that the boost voltage is greater than the power supply voltage; and
    a low-voltage transistor coupled to the comparator and configured to select the power supply voltage as the maximum voltage when the comparator output indicates that the power supply voltage is greater than the boost voltage.

2. The switcher of claim 1, wherein the maximum voltage selector is configured to provide the maximum voltage to bulk nodes of a boost high side transistor and a buck high side transistor in the integrated circuit.

3. The switcher of claim 2, wherein the maximum voltage selector is further configured to provide the maximum voltage to bulk nodes of the first and second transistors in the maximum voltage selector.

4. The switcher of claim 1, wherein the maximum voltage selector further comprises an inverter coupled between the comparator and the first transistor.

5. The switcher of claim 1, wherein the integrated circuit further comprises a pulse width modulation controller configured to generate a boost signal and a buck signal.

6. The switcher of claim 5, wherein the integrated circuit further comprises:
    a boost high side transistor configured to be (i) turned on with a specified boost duty cycle based on the boost signal when the mode signal corresponds to the boost mode and (ii) turned off based on the boost signal when the mode signal corresponds to the buck mode; and
    a buck high side transistor configured to be (i) turned on with a specified buck duty cycle based on the buck signal when the mode signal corresponds to the buck mode and (ii), turned off based on the buck signal when the mode signal corresponds to the boost mode.

7. The switcher of claim 1, wherein the integrated circuit further comprises a non-series-coupled boost high side transistor with respect to a current path for the buck mode.

8. The switcher of claim 1, further comprising an output buck capacitor coupled to the integrated circuit and configured to filter the buck voltage, and wherein the inductor is coupled between the integrated circuit and the output buck capacitor.

9. The switcher of claim 1, further comprising an output boost capacitor coupled to the integrated circuit and configured to filter the boost voltage.

10. A mobile device, comprising:
    a power supply configured to generate a power supply voltage; a buck component; a boost component; and a buck (with boost) switcher coupled to the power supply, the buck component and the boost component, the switcher configured to (i) operate in one of a buck mode and a boost mode, (ii) generate in the buck mode a buck voltage for the buck component based on the power supply voltage using an inductor, and (iii) generate in the boost mode a boost voltage for the boost component based on the power supply voltage using the inductor;
    wherein the switcher comprises a maximum voltage selector configured to select one of the power supply voltage and the boost voltage as a maximum voltage for use in operating the switcher, the maximum voltage selector comprising:
    a comparator configured to compare the power supply voltage and the boost voltage to generate a comparator output;
    a high-voltage transistor coupled to the comparator and configured to select the boost voltage as the maximum voltage when the comparator output indicates that the boost voltage is greater than the power supply voltage; and
    a low-voltage transistor coupled to the comparator and configured to select the power supply voltage as the maximum voltage when the comparator output indicates that the power supply voltage is greater than the boost voltage.

11. The mobile device of claim 10, wherein the maximum voltage selector is configured to provide the maximum voltage to bulk nodes of a boost high side transistor and a buck high side transistor in the switcher.

12. The mobile device of claim 10, wherein the switcher further comprises:
  a buck high side transistor;
  a boost high side transistor; and
  a low side transistor;
  wherein a buck current path is provided through the buck high side transistor and the low side transistor when the switcher is operating in the buck mode; and
  wherein the boost high side transistor comprises a non-series-coupled switch with respect to the buck current path.

13. The mobile device of claim 10, further comprising a camera;
  wherein the buck component comprises a power amplifier and the boost component comprises a flash for the camera.

14. A buck (with boost) switcher capable of receiving a mode signal, the mode signal corresponding to one of a buck mode and a boost mode, the switcher comprising:
  a buck high side transistor configured to be (i) turned on with a specified buck duty cycle when the mode signal corresponds to the buck mode and (ii) turned off when the mode signal corresponds to the boost mode;
  a boost high side transistor configured to be (i) turned on with a specified boost duty cycle when the mode signal corresponds to the boost mode and (ii) turned off when the mode signal corresponds to the buck mode, and
  a maximum voltage selector configured to select one of the power supply voltage and the boost voltage as a maximum voltage for use in operating the switcher, the maximum voltage selector comprising:
    a comparator configured to compare the power supply voltage and the boost voltage to generate a comparator output;
    a high-voltage transistor coupled to the comparator and configured to select the boost voltage as the maximum voltage when the comparator output indicates that the boost voltage is greater than the power supply voltage; and
    a low-voltage transistor coupled to the comparator and configured to select the power supply voltage as the maximum voltage when the comparator output indicates that the power supply voltage is greater than the boost voltage.

15. The switcher of claim 14, further comprising a single inductor configured to be used to generate a boost output in the boost mode and to generate a buck output in the buck mode.

16. The switcher of claim 14, further comprising a low side transistor;
  wherein a buck current path is provided through the buck high side transistor and the low side transistor when the switcher is operating in the buck mode; and
  wherein a boost current path is provided through the boost high side transistor and the low side transistor when the switcher is operating in the boost mode.

17. The switcher of claim 14, further comprising a pulse width modulation controller configured to generate a boost signal for the boost high side transistor and a buck signal for the buck high side transistor.

18. The switcher of claim 14, further comprising an output buck capacitor.

19. The switcher of claim 14, further comprising an output boost capacitor.

20. The switcher of claim 14, wherein the boost high side transistor comprises a non-series-coupled switch with respect to a buck current path for the buck mode.

* * * * *